(12) United States Patent
Nothum, Jr.

(10) Patent No.: US 7,107,899 B2
(45) Date of Patent: Sep. 19, 2006

(54) SPIRAL OVEN, HEAT DELIVERY, ENCLOSURE AND DRIVE

(76) Inventor: Robert G. Nothum, Jr., 6356 W. State Hwy O, Willard, MO (US) 65804

( * ) Notice: Subject to any disclaimer, the term of this patent is extended or adjusted under 35 U.S.C. 154(b) by 512 days.

(21) Appl. No.: 10/339,176

(22) Filed: Jan. 9, 2003

(65) Prior Publication Data

US 2005/0092730 A1 May 5, 2005

Related U.S. Application Data

(60) Provisional application No. 60/348,059, filed on Jan. 11, 2002, provisional application No. 60/348,007, filed on Jan. 10, 2002.

(51) Int. Cl.
*A47J 27/16* (2006.01)
*A47J 37/04* (2006.01)
*B65G 27/02* (2006.01)

(52) U.S. Cl. .................... 99/443 C; 99/479; 99/386

(58) Field of Classification Search .......... 99/443 C, 99/443 R, 386, 427, 477, 479; 126/21 A, 126/21 R; 198/778, 883
See application file for complete search history.

(56) References Cited

U.S. PATENT DOCUMENTS

| 2,228,998 | A |   | 1/1941  | Birdseye ................... 62/99 |
|-----------|---|---|---------|-----------------------------------|
| 2,229,000 | A |   | 1/1941  | Birdseye .................. 62/114 |
| 3,435,755 | A | * | 4/1969  | Lohr et al. ................ 99/424 |
| 3,584,471 | A |   | 6/1971  | Powell .................... 62/380 |
| 3,834,408 | A | * | 9/1974  | Thalacker .................. 134/83 |
| 4,118,181 | A |   | 10/1978 | Onodera ................... 432/121 |
| 4,191,881 | A | * | 3/1980  | Ahlgren et al. ............. 219/388 |
| 4,631,029 | A | * | 12/1986 | Lanham et al. ............. 432/133 |
| 5,189,948 | A | * | 3/1993  | Liebermann ............... 99/443 C |
| 5,205,135 | A |   | 4/1993  | Lang ....................... 62/381 |
| 5,220,803 | A |   | 6/1993  | Kiczek ...................... 62/63 |
| 5,346,057 | A |   | 9/1994  | Fisher et al. .............. 198/778 |
| 5,460,260 | A |   | 10/1995 | Ochs et al. ................ 198/778 |
| 5,485,731 | A |   | 1/1996  | Venetucci et al. ............ 62/378 |
| 5,850,781 | A | * | 12/1998 | Kuenen .................. 99/443 C |
| 6,095,805 | A |   | 8/2000  | Kuenen ................... 432/144 |
| 6,305,274 | B1|   | 10/2001 | Nothum, Sr. et al. ......... 99/404 |

FOREIGN PATENT DOCUMENTS

| EP | 0870430 A  | 10/1998 |
|----|------------|---------|
| GB | 598744     | 2/1948  |
| JP | 5500877    | 1/1980  |
| JP | 2002068436 | 3/2002  |
| SU | 741023     | 6/1980  |
| WO | 9727130    | 7/1997  |

OTHER PUBLICATIONS

Product Brochure of Advanced Food Processing Equipment. Inc.. entitled "Advanced I.Q.F. Spiral Freezer" (2 ledger-size sheets), undated.
Product Brochure of Frigoscandia Equipment. AB. entitled "Frigoscandia Classic Line" (5 sheets), undated.

* cited by examiner

*Primary Examiner*—Reginald L. Alexander
(74) *Attorney, Agent, or Firm*—Jonathan A. Bay

(57) ABSTRACT

A spiral oven for continuous duty in continuous food process lines has an oven compartment enclosing a double-helix arrangement, of which there is a helical run of a food-carrying conveyor in combination with a helical assembly of heat-delivery elements. Accordingly, the double-helix arrangement provides close proximity between the food product on the conveyor and the heat-delivery elements.

24 Claims, 6 Drawing Sheets

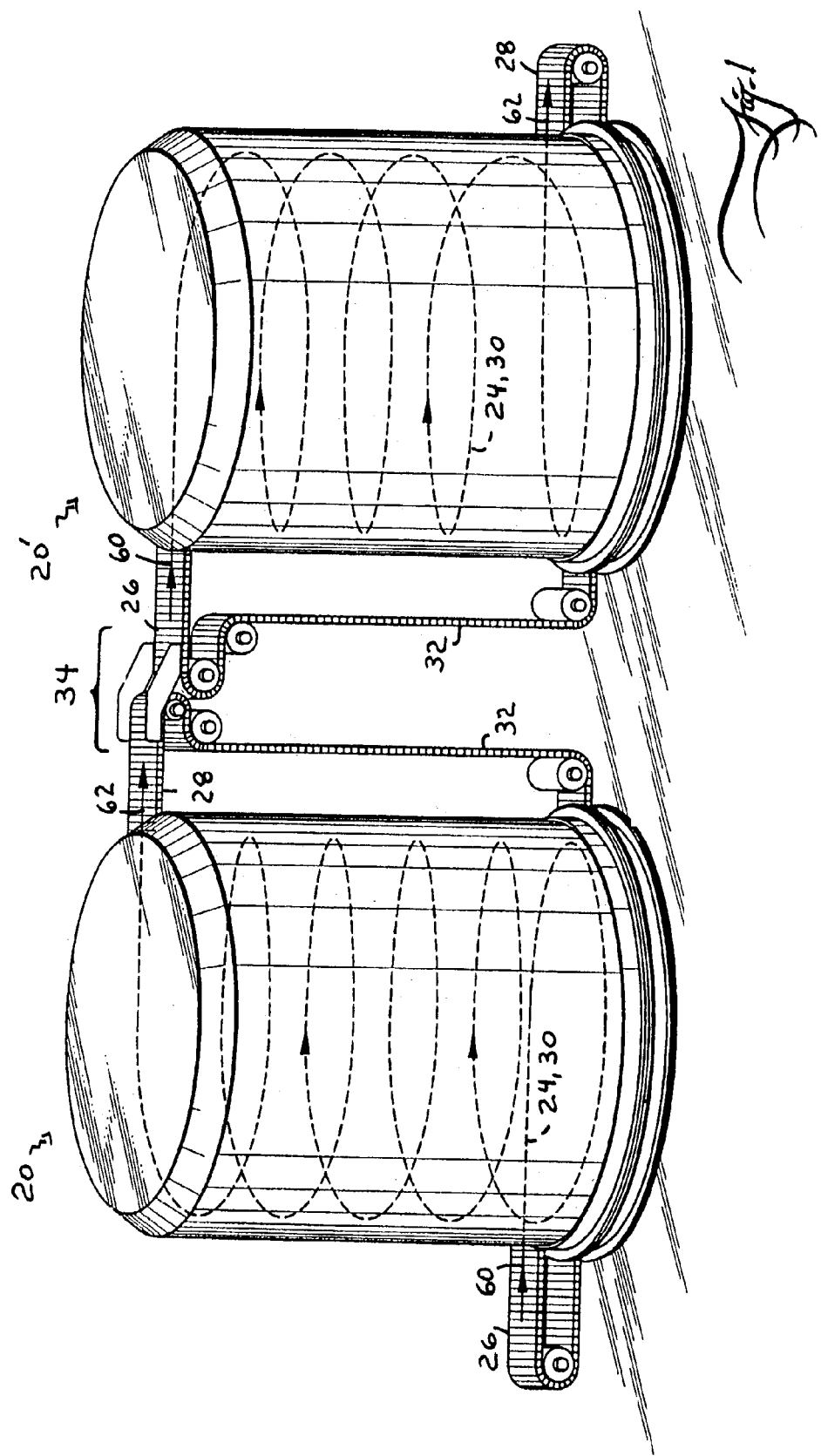

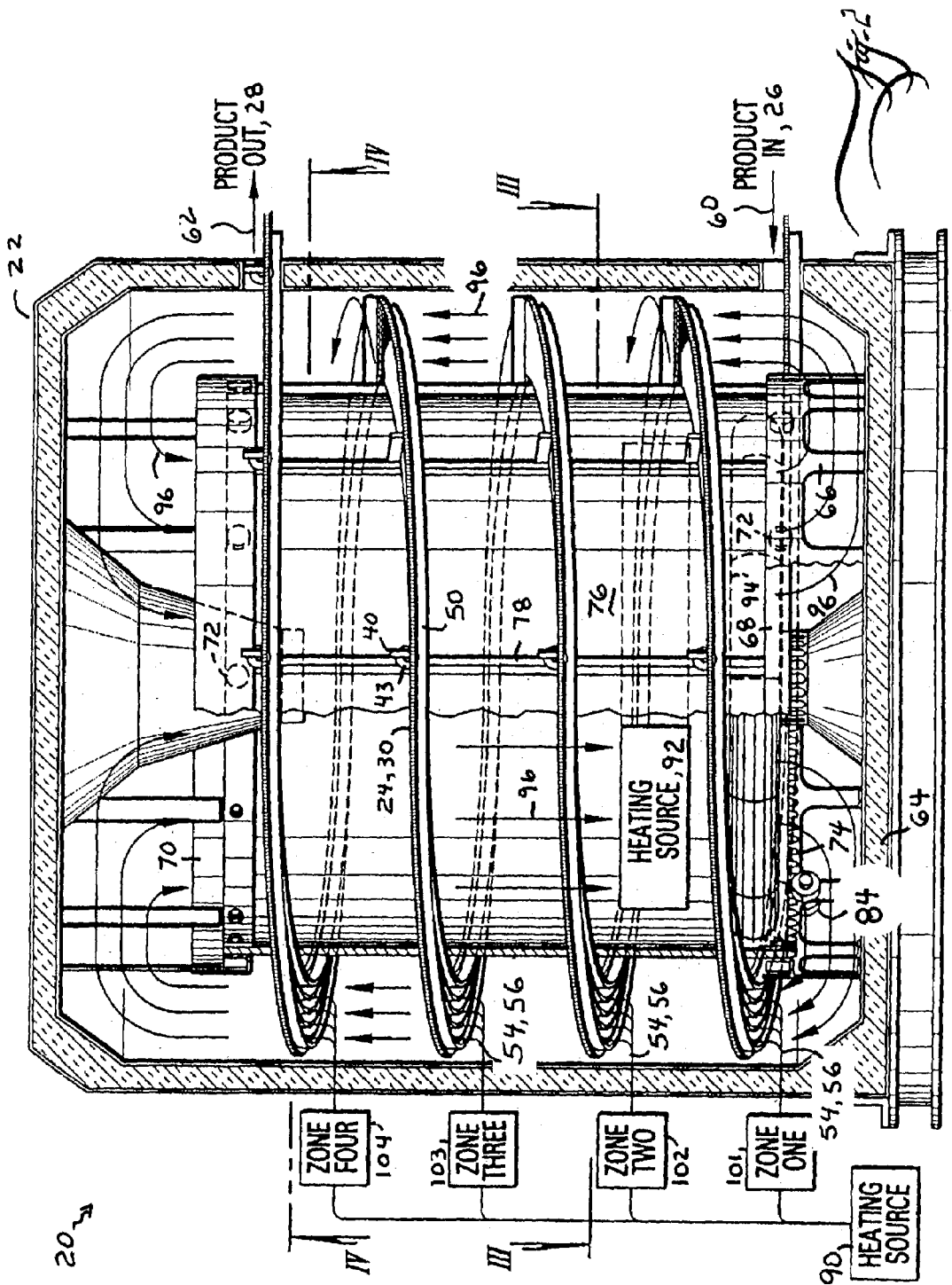

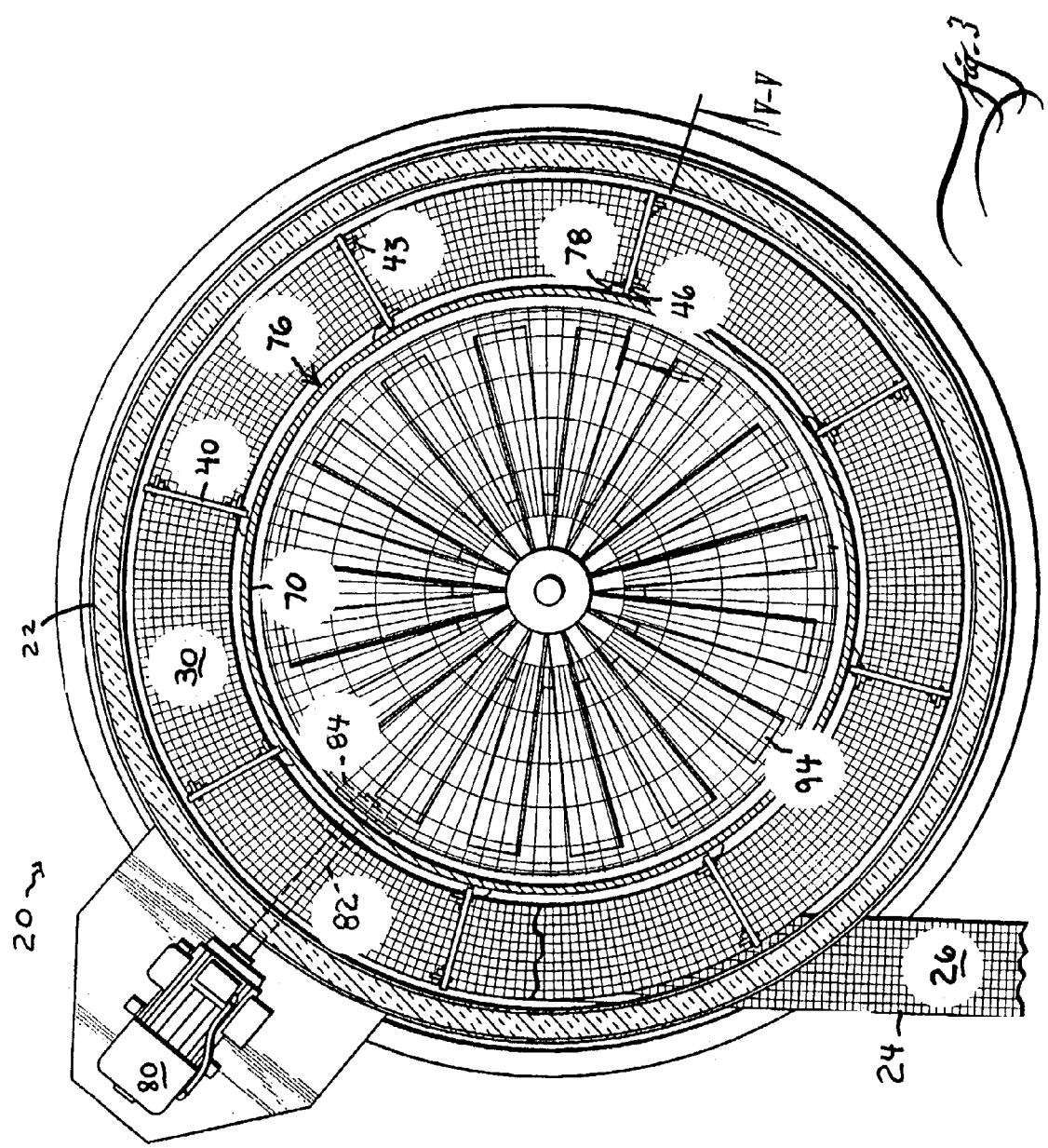

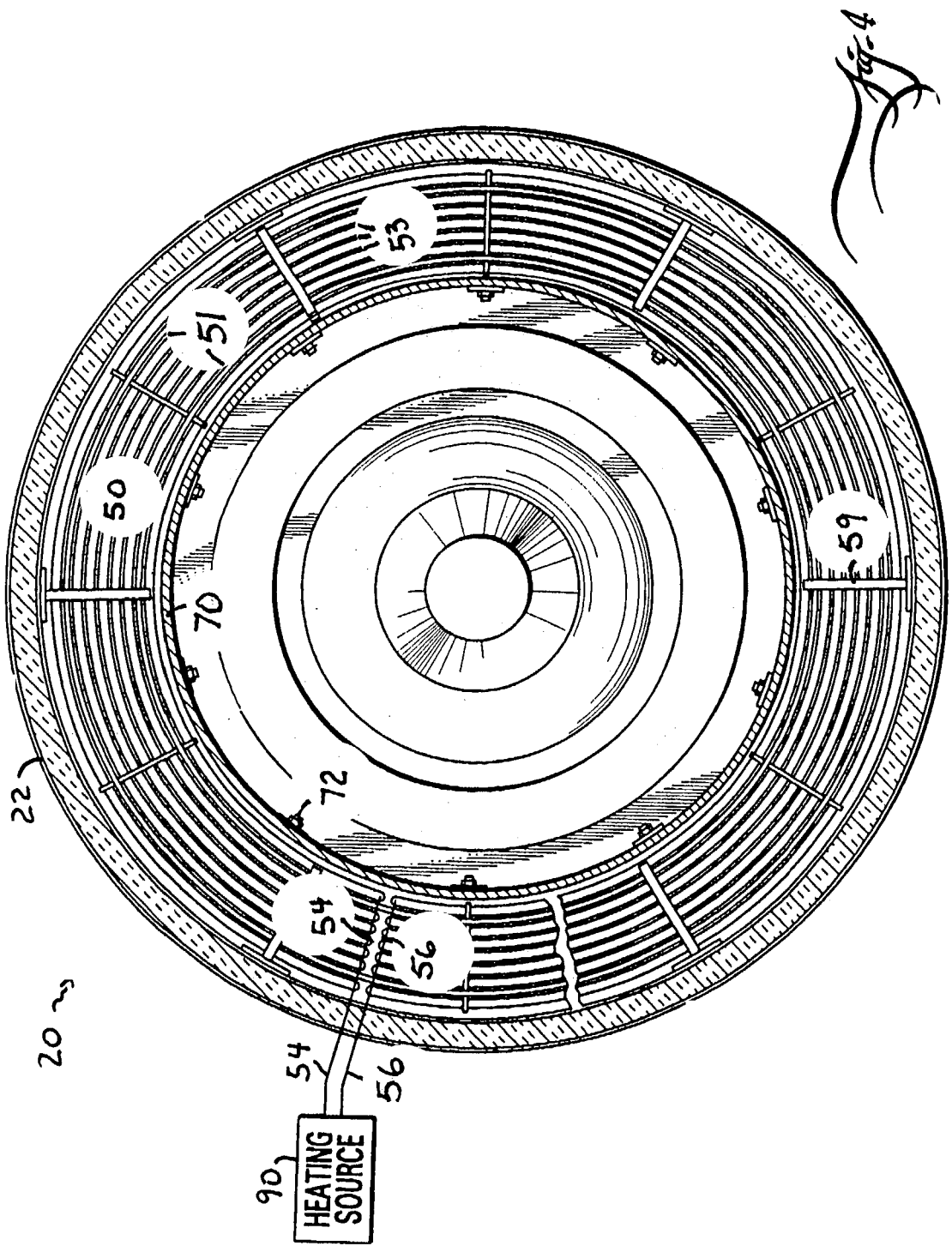

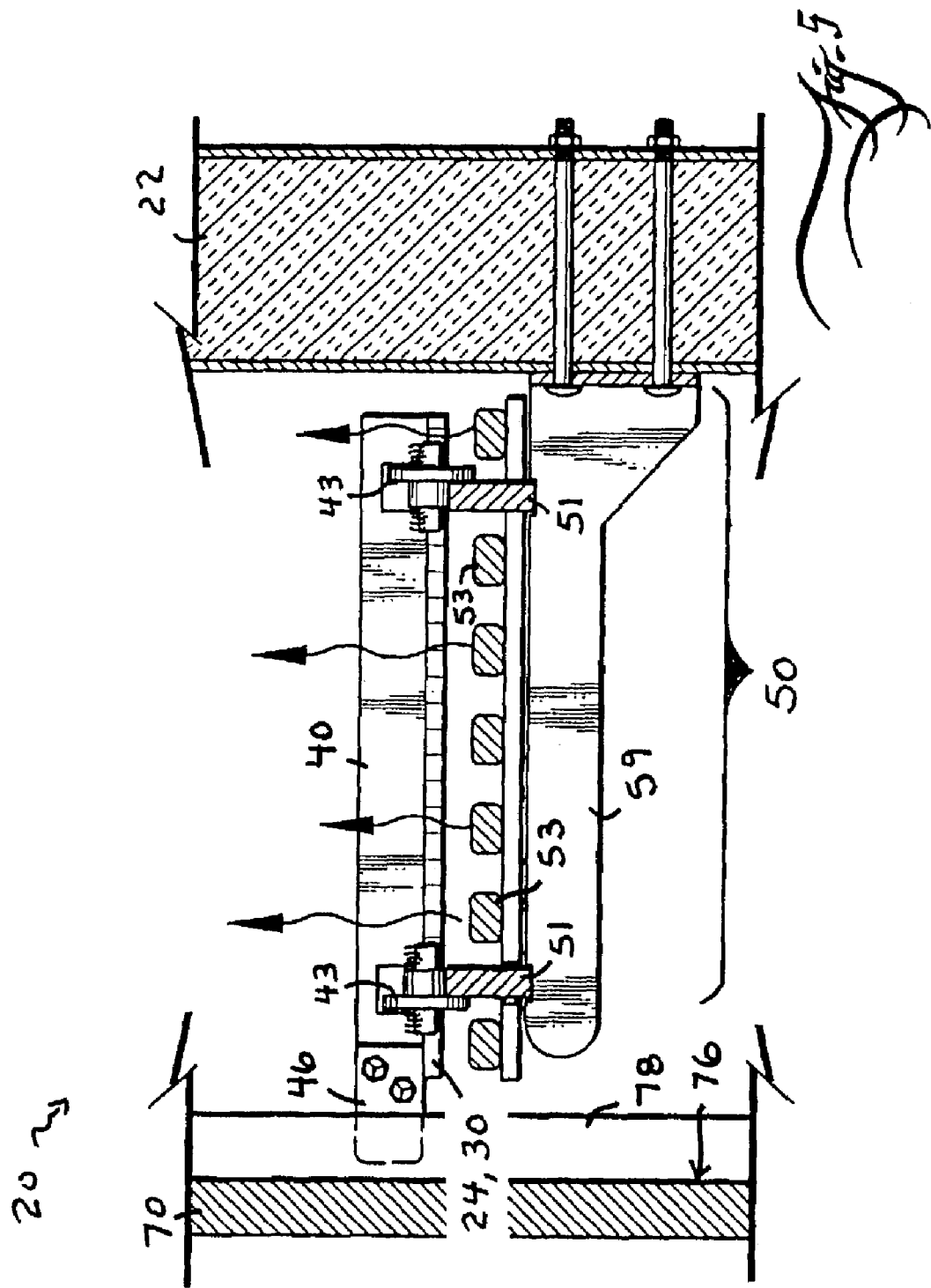

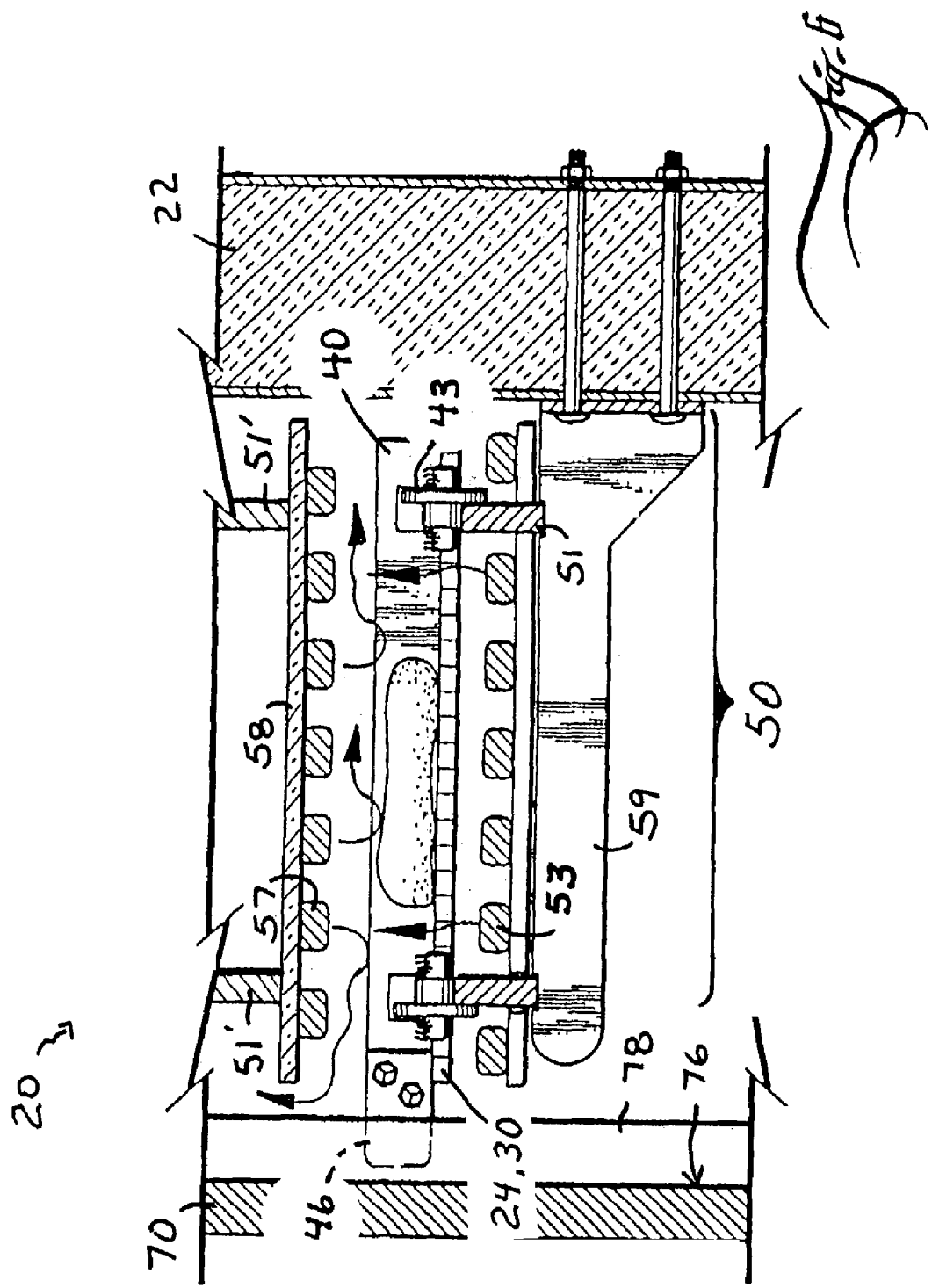

SPIRAL OVEN, HEAT DELIVERY, ENCLOSURE AND DRIVE

CROSS-REFERENCE TO PROVISIONAL APPLICATION(S)

This application claims the benefit of U.S. Provisional Application No. 60/348,059, filed Jan. 11, 2002, and U.S. Provisional Application No. 60/348,007, filed Jan. 10, 2002.

This application is co-pending with commonly-owned, commonly-invented U.S. patent application Ser. No. 10/339,176, filed on even date herewith and entitled "SPIRAL FREEZER, REFRIGERATION DELIVERY, ENCLOSURE AND DRIVE." All three of the foregoing patent disclosures are incorporated herein by reference.

BACKGROUND OF THE INVENTION

The invention generally relates to large scale food process lines of the type having a series of machines or stations arranged together and performing distinct processes on articles of food product for ultimately producing packaged and frozen food product. The frozen and packaged food product affords distribution to restaurant and/or consumer grocery stores and the like. For example and without limitation, in the case of frozen baked chicken for the fast food or consumer grocery stores, such a food process line might comprise the following stations in series:—1) dry-coat, 2) wet-coat, 3) bake, 4) freeze and package and so on.

Given the foregoing, the invention more particularly relates to a spiral oven as well as heat delivery and drive therefor in order to accomplish much of the same work as by the known spiral ovens of large scale food process lines except scalable in a range between large and compact scale extremes.

A number of additional features and objects will be apparent in connection with the following discussion of preferred embodiments and examples.

SUMMARY OF THE INVENTION

It is an object of the invention to improve energy efficiency with the energy consumption needs of a continuous duty oven as utilized in continuous food process lines.

It is another object of the invention to achieve the foregoing energy efficiency by scaling the oven compartment to compact size as practicable for a given size of conveyor.

It is an additional object of the invention to position the heat-delivery elements of the oven close to the main food-carrying run of the oven's conveyor in order to achieve improved proximity between the food product on the conveyor and the heat-delivery elements.

These and other objects and aspects of the invention are achieved in one version that has an oven compartment enclosing a double-helix arrangement comprising one of a helical run of a food-carrying conveyor and another of a helical assembly of heat-delivery elements. For this purpose a given heat source provides an operative current of a medium which activates the heat-delivery elements. Given the foregoing, such a double-helical arrangement of conveyor and heat-delivery elements provides close proximity between the delivery of heat from the heat-delivery elements to the sink of that heat into the food product on the conveyor.

Optionally, the heat source comprises electric power, the heat-delivery elements comprise resistive heating elements, and the medium comprises electric current. Alternatively, the heat source comprises a thermal-fluid heating and circulating system, the heat-delivery elements comprise hollow tubes, and the medium comprises a thermal fluid. Preferably the heat-delivery elements are wound in tandem with a helical ramp for the helical run of the conveyor to transit thereon. Additionally, the oven-sensitive components of a conveyor drive system comprising any of motors, engines or turbines are preferably disposed outside of the oven compartment to reduce degradation or damage. It is another preferred aspect of the invention that the oven compartment comprises a cylindrical tower closely surrounding the double-helix arrangement.

The helical run of the conveyor is flanked between an inflow section and an outflow section, and the oven compartment includes an inflow port and outflow port sized and arranged for through passage of the conveyor's inflow and outflow sections respectively. The conveyor further comprises a return run linking the outflow section with the inflow section, and this return run preferably extends along a course disposed at least predominantly outside the oven compartment.

An alternative way of reckoning the invention can be as follows. The oven comprises a conveyor having in sequence a food-carrying inflow section, main run, and outflow section as well as an empty return run. The main run either ascends or descends in coils from the inflow section to the outflow section for economy of floor space. There is an arrangement of heat-delivery elements entwined with the main run. An oven compartment is provided for enclosing at least the coiled main run of the food-carrying conveyor and entwined heat-delivery elements. The heat-delivery elements are adapted for service connections to a source system which provides an input that activates the heat-delivery elements. Given this, the entwined arrangement of conveyor and heat-delivery elements provides close proximity between the food product and heat-delivery elements.

The heat-delivery elements are entwined by virtue of being interlaced between the coils of the conveyor's main run. In one version of the invention the coils wrap a cylindrical surface such that the ascension or descension of the coils is constant over the extent of the main and hence the main run defines a helical ribbon. In this version of the invention then the heat-delivery elements are arranged in a corresponding helical ribbon arrangement intertwined with the main run's helical ribbon arrangement. A further embellishment might have individual ones of the heat-delivery elements occupying set lanes in the helical ribbon arrangement thereof.

Still another understanding the invention from perhaps a different take might go as follows. That is, the heat-delivery elements, which in preferred respects are arranged for close-proximity interaction with food product carried on the coiled run of the conveyor, are arranged any of these various ways. For one, the heat-delivery elements might be arranged to undergird the coiled run. For another, the heat-delivery elements might be arranged in close-proximity in part with the coiled run of the conveyor by virtue of being arranged in a coiled assembly which as an assembly coils in tandem with and spaced closely overhead the coiled run. The oven of claim 18 further comprising a coiled shelf coiled in tandem with the coiled run and coiled assembly of heat-delivery elements wherein said shelf either catches drippings from above and/or prevents drippings from passing thereby to below.

A further inventive aspect of the oven is that, if the coiled run is imagined as wrapping around the surface of an imaginary solid such as in the case of circular symmetry, a cylinder, the accordingly it defines a hollow core for itself (ie., cylindrical for circular symmetry). Given that, then the oven preferably further comprises a conveyor drive system that has a driven barrel disposed inside the hollow cylindrical core of the coiled run, the barrel impermanently interfacing the coiled run at least at intervals to motivate the conveyor in a direction of advance through the coiled run. Such a conveyor drive system would be adapted for thermally isolating oven-sensitive components that comprise any of motors, engines or turbines from damaging exposure in the oven compartment by virtue of placement outside of the oven compartment. In other words, the driven barrel is supplied a drive input from outside the oven compartment, and is immediately driven by a drive shaft that is passed into the oven compartment.

The oven as mentioned preferably comprises a tower closely surrounding the coiled run. The tower has a floor and ceiling. The barrel is propped or suspended off the floor of the oven and gapped from the ceiling in order that there is clearance both above and below the barrel for circulation of air currents inside the oven compartment. To effect air circulation there is also a circulating fan for setting up air circulation inside the oven compartment, the air circulation blowing in one direction inside the barrel and returning in the opposite direction on the outside of the barrel like a donut skin turning inside out.

Another significant inventive aspect of the oven includes the factor of zoning. That is, the heat-delivery elements can be differentiated into zones according to elevation. The heat source system differentially serves the differentiated zones of heat-delivery elements in order to establish elevational zones within the oven compartment that can be differentiated according what heat load can be delivered. Again, the heat source/system might comprise electric power service such that the heat-delivery elements comprise resistive heating elements and the input medium comprises electric current. Alternatively, the heat source/system might comprise a thermal-fluid heating and circulating system such that the heat-delivery elements comprise hollow tubes and the medium comprises a thermal fluid.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a matched pair of spiral ovens housed inside each's own enclosure therefor and in accordance with the invention, wherein the view shows a full-tier style of infeed/discharge configuration as an example only for convenience of illustrative purposes;

FIG. 2 is an enlarged, partial section view of the spiral oven and enclosure that is on the left side of FIG. 1 and as representative of the other, wherein said partial section view is taken through a vertical plane containing the central axis, and wherein the inside barrel is partly broken away;

FIG. 3 is a section view taken along line III—III in FIG. 2;

FIG. 4 is a section view taken along line IV—IV in FIG. 2;

FIG. 5 is a section view taken along line V—V in FIG. 3; and,

FIG. 6 is a section view comparable to FIG. 5 except showing an alternate embodiment of the spiral tubes which circulate the hot medium that supplies the heat.

DETAILED DESCRIPTION OF THE PREFERRED EMBODIMENTS

FIG. 1 is a perspective view of a matched pair of spiral ovens 20 and 20' in accordance with the invention, each characterized by an insulated cylindrical tower enclosure 22. The ovens 20,20' are supplied food product from upline processes and transit the food product therethrough on conveyors 24. For both ovens 20 and 20', FIG. 1 shows a full-tier style of conveyor infeed 26 to discharge 28 configuration as an example only for convenience of illustrative purposes. That is, the conveyor discharge 28 shoots out on a tangent that projects about 180° opposite (ie., relative the vertical axis of the spiral's center) from the tangent of the infeed 26. In the art, other configurations are known including without limitation ¼-tier (90°), ¾-tier (270°) and ½-tier (180°) and so on. The invention is not limited to any particular infeed 26 to discharge 28 configuration.

The oven 20 on the left side of the view is relatively upline from the oven 20' on the right, which therefore is relatively downline. The upline oven 20 has a low conveyor infeed section 26 and discharges high at section 28. An intermediate transfer arrangement 34 accomplishes transfer of product discharged from the upline oven 20 to the infeed section 26 of the downline oven 20'. Since the upline oven 20 has a high discharge 28, the downline oven 20' has a matching high infeed section 26. Accordingly, the downline oven 20' discharges low at 28 therefor, or about the original elevation of the upline oven's infeed section 26 (ie., for oven 20). This low elevation presumptively corresponds to the upline food process line's main elevation for the main food-product carrying run therefor (eg., upline other processes not shown).

Arranging the ovens 20 and/or 20' in spiral formation achieves perhaps a thirty-five to forty-five minute baking time in a short span of floor space. A comparable linear oven (not shown) would stretch out over an interminably long length. Separate cylindrical housings 22 advantageously allow shrinking the enclosed oven space in contrast to both spiral ovens 20 and 20' being enclosed in a common container. The separate enclosures 22 and 22 also facilitate one way, among others, to achieve "zoning" as will be more particularly described below in connection with FIG. 2.

Each spiral oven 20 (and/or 20') comprises a continuous conveyor 24, spaced portions of which are shown by FIG. 1. That is, a small section of conveyor 24 is in view at an infeed station 24, another like small section of conveyor 24 is in view at the discharge station 28. As better shown by FIG. 2, the conveyor 24 provides a main food-carrying run 30 between the infeed and discharge stations 26 and 28. In FIG. 2, the main food-product carrying run 30 of the conveyor 24 spirals up from the low infeed station 26 to the high discharge station 28 (and vice versa for the downline oven 20' shown in FIG. 1). Although this is not shown by the drawings, food product can be originally introduced onto the low infeed section 26 of the upline oven 20 by a conventional transfer arrangement from an upline conveyor or the like, as is known in the art. Similarly, food product can be discharged from the low discharge 28 of the downline oven 20' onto downline conveyors by conventional transfer arrangements or the like as is also known in the art. FIG. 1 shows an example transfer arrangement 34 although it is situated between the two ovens 20 and 20'.

FIG. 1 also shows that the discharge and infeed sections 28 and 26 of the continuous conveyors 24 are linked together by return runs 32 for each conveyor 24 of the respective ovens 20 and 20'. Persons having ordinary skill in the art can readily construct such an arrangement of a return run 32, which return run 32 is preferably situated entirely or predominantly outside of the oven compartment inside each enclosure 22.

The food-carrying conveyors 24 preferably take the form of, for example and without limitation, a woven wire mesh belt as shown by U.S. Pat. No. 6,305,274—Nothum (or as more particularly shown by FIG. 6 thereof). Woven wire mesh belts such as that are advantageously formed into endless conveyors such as here. These woven wire belts are desirable for many reasons. Among them, these belts provide greater than 85% open area. This allows fairly unrestricted hot air circulation to get at the food product. This also facilitates wash down and inspection. They are lightweight and do not demand much drive power. Also, they turn tight circumferences around small transfer rollers to ensure gentle handling and smooth transfer of various delicate products. These belts can be produced in about any width, with commercially available sources providing standardized widths available off-the-shelf as anywhere between about four inches (0.1 m) and twelve feet (3.7 m). Needless to say, these belts can be produced in indefinitely long lengths.

FIG. 2 of the drawings shows that the conveyor 24 in accordance with the invention further comprises a series of longitudinally spaced flights 40 fixed to the conveyor 24, preferably with a uniform spacing therebetween. FIG. 5 shows one such flight 40 in better detail. To turn to FIG. 5, it shows a transverse section cut of the conveyor 24 as provided with a transverse flight 40 sitting on the conveyor 24's food-carrying run 30. The flight 40 has mounted to it spaced inboard and outboard rollers 43. The rollers 43 in part are mounted for riding along the top of the conveyor-carrying tracks 51 of assembly 50, which will be more particularly described below. The rollers 43 are mounted in other part for opposite flanking shoulders to ride to track against the opposite lateral sides of the conveyor-carrying tracks 51 of assembly 50 as shown. The rollers 43 cooperate to reduce sliding resistance as well as maintain tracking therefor. The flight 40 extends between a relatively inboard end 46 and outboard end (not indicated by any reference numeral). The inboard end 46 terminates in an overhang section that overhangs the inboard one of the tracking-rollers 43. The operative advantages of the inboard overhang 46 are more particularly described below in connection with driving the conveyor 24 up the assembly 50 that comprises the spiral ramp (eg., 50).

Returning to FIG. 2, the conveyor 24's food-carrying run 30 traverses along a course set for it by the spiral ramp assembly 50. The spiral ramp 50 is continuous between the infeed station 26 through to the discharge station 28. FIGS. 2 and 5 taken together show that this spiral ramp is produced from a series of elements 51 as well as 53 helically coiled as shown. A bracket 59 attached to the sidewall of the enclosure 22 directly carries the tracks 51. The bracket 59 indirectly props up the elements 53, there being an intermediate insulating layer between bracket 59 and elements 53 because optionally elements 53 comprises resistive heating elements.

Alternatively, the elements 53 could be configured as hollow tubes for circulating a hot thermal fluid like oil, steam or flue gas as more particularly described in connection with more particularly shown and described in the above-referenced U.S. Pat. No. 6,305,274—Nothum, which is incorporated herein by this reference to it. If so, preferably such parallel helixes of hollow tubes are arranged side by side and spaced by gaps.

The track elements 51 are optionally passive or, in other words, optionally not actively involved in heat delivery. The track elements 51 are stood on their narrow sides, and it is upon the upper ones of the narrow sides which the tracking-rollers 43 ride. The upper narrow sides of the track elements 51 are arranged on a uniform level to present a smooth spiral ramp (eg., 50), or scrape or rolling surface for the main food-carrying run 30 of the conveyor 24. All the elements and/or tubes 51 and 53 are preferably gapped to ensure not only thermal and electrical isolation, but also to increase the heat exchanging surface area and thereby enhance the efficiency of heating in the oven 20.

Again, in accordance with one alternative version of the invention, the indicated elements 53 could optional comprise hollow tubes. Inside such hollow tubes 53 would be serviced by thermal-medium heating and circulating system indicated in FIG. 2 as 90 for pumping a hot medium therethrough. The hot medium provides one option for supplying heat to the oven compartment. Preferably the circulating hot medium is an oil, steam, or a flue gas:—oil is probably more common because it is less difficult to manage than steam or flue gases. FIG. 2 shows the thermal-medium heating and circulating system 90 optionally located outside the enclosure 22 defining the oven compartment. This heat source 90 both re-heats the hot medium as well as pumps the hot medium. The heat source 90 may include a fuel-fired heat exchanger arrangement as known in the art. This is known as indirect-fired heating. In contrast, direct-fired types would have the oven tubes 53 arranged as the actual flues that vent the combustion gases of a combustion source (not shown but not excluded). An indirect-fired arrangement 90 is preferred because the re-circulating hot medium is recycled and re-heated by the remote combustion or heat source 90 shown in FIG. 2. Locating it outside the oven 20's enclosure 22 has less to do with energy efficiency reasons than the more important consideration of making it accessible to service personnel in instances of maintenance, adjustment and/or malfunctioning.

FIGS. 1 and 2 show that a given enclosure 22 comprises a closed cylinder having insulated walls. The enclosure 22 is provided with infeed and discharge openings 60 and 62 for the introduction and discharge of the conveyor 24. FIG. 2 shows that the enclosure 22 has a floor 64 on which stands a squat stand 66. The squat stand 66 has a set of short legs arranged in a circle to prop up a circular track 68. FIG. 2 (among others) shows that the hollow interior of the spiral ramp 50 is occupied by a large turning barrel 70 stood on an end. The barrel 70 has a bottom end carrying a series of rollers 72 to ride in the circular track 68 of the squat stand 66. FIG. 2 also shows that the barrel 70 has a top end carrying a like series of rollers 72 to ride in a hoop track 68 that is suspended from the enclosure 22's ceiling. The squat stand 66 props up the barrel 70 some spacing off the floor 64 of the enclosure. The rollers 72 riding in the circular track 68 allow the barrel 70 to revolve about the vertical central axis. The bottom rim of the barrel 70 is formed with gear teeth such that the barrel 70's bottom rim takes the form of a ring gear 74, which can be alternatively described as a face gear 74. FIG. 3 shows that at least one or more electric motors 80 are mounted outside the enclosure for supplying drive power to the barrel 70. The electric motor 80 turns a drive shaft 82 which extends in through a journal or bearing in the enclosure 22's sidewall and which is supported or braced from or to the squat stand 66 by a gudgeon or the like, to terminate in a pinion 84 aligned to mesh with the barrel 70's face gear 74. Hence turning the drive shaft 82 turns the pinion 84 which in turn causes the barrel 70 to revolve on top of the squat stand 66's ring track 68.

Any of FIGS. 2, 3 or 4 among others, show that the barrel 70 has an outer wall or skin 76 that is striped with a series of paddles 78. The exterior paddles 78 project out sufficiently to catch and drive against the inboard overhangs 46 of the conveyor 24's flights 40. Hence the conveyor 24 is motivated up the spiral ramp 50 in this fashion. The turning barrel 70 has the paddles 78 revolving in unison with the barrel 70's skin 76. The infeed section 26 of the conveyor 24 is fed to the barrel 70 along a tangent of the barrel's skin 76. The tangential course of the infeed section 26 is aligned such that the inboard overhang 46 approaches so as to just nearly touch the barrel 70's skin 76. While this is happening, then along comes one of the vertical paddles 78 on the barrel 70's skin 76 and smacks up against the inboard end 46 of the conveyor 24's flight 40. The vertical paddle 78 drives the flight such that the entire conveyor 24 is motivated to advance or traverse forwardly on the spiral ramp 50 in consequence. Indeed, this action between barrel paddles 78 and conveyor flights 40 occurs in endless succession so that at any one instance, there are numerous flights being driven by the several paddles 78. For example, FIG. 3 shows that the barrel has about eight (8) paddles 78 angularly spaced evenly from each other. The conveyor 24's flights 40 are spaced correspondingly such that for each 360° around one helical coil there are eight (8) flights 40 in driven contact with the eight (8) paddles 78. If it is reckoned in FIG. 2 that there are very approximately about 4 helical coils, then there are about thirty-two (32) concurrent instances of paddle-to-flight contact (ie., 78-to-40 contact). In this way the turning barrel 70 supplies drive power to the conveyor 24.

FIG. 5 shows one example instance of paddle-to-flight contact (ie., 78-to-40 contact). The revolving paddle 78—revolving because the barrel skin 76 to which it is attached is revolving—pushes against the flight 40 to motivate the flight 40 and the woven wire mesh belt sections between spaced flights 40 to move in the direction of advance up the helical ramp 50. As this flight 40 winds its way around the helical coils of the ramp 50, it slides vertically up the paddle 78 at the same time. When this given flight 40 first contacts the paddle 78 at the infeed station 26, it hits the paddle 78 near the lower end thereof. In contrast, when this given flight 40 separates from the paddle 78 on a tangential exit line at the discharge station 28, the flight 40 does so from the upper end of that paddle 78. Hence all the time the flight 40 is pushed by the paddle 78 it is slowly sliding upwardly too. FIG. 5 also shows the cooperation of the inboard and outboard tracking-rollers 43 in preventing the flight 40 from deflecting off the paddle 78.

To return to the series of elements 53 which might be resistive heating elements, FIGS. 2 and 4 feed and return connections 54 and 56. However with the alternative version of the invention having elements 53 comprise hollow tubes, these items 54 and 56 might comprise supply and exhaust headers 54 and 56 for hot medium such as more particularly shown and described in the above-referenced U.S. Pat. No. 6,305,274—Nothum, which is incorporated herein by this reference to it.

Heat delivery in ovens such as 20/20' might be more simply achieve by resistive heating. The resistive heating elements 53 are helically wound in tandem with the ramp assembly 50 as a whole. FIG. 5 shows that the conveyor 24's (or more accurately the main run 30 thereof) woven wire mesh preferably traverses within close proximity to the elements 53 to close up the spacing between the food product and the heat delivery of the elements 53. FIGS. 2 and 3 shows a fan 94 disposed inside the interior of the barrel 70 for circulating the oven air (and indicated as 96 in FIG. 2) within the oven compartment as a whole. FIG. 5 shows that the air is circulated 96 such that it blows up through the gaps between the elements 53. FIG. 2 shows that the overall air circulation 96 pattern is like a donut skin rotating inside and out as shown, without actually orbiting the vertical central axis. It is an advantage to prop up the barrel 70 by the squat stand 66 to allow an underflow of circulating air. FIG. 2 also shows that the barrel 70's upper edge is gapped away from the enclosure 22's ceiling to likewise allow an overflow as desired.

Given the foregoing, the advantages of the invention include the following. The oven enclosure 22 that houses the spiral ramp 50 is shrunk down closely surround the outside of the spiral oven ramp 50 for a more compact oven compartment. The barrel 70 provides an advantageous way of driving the conveyor 24/30, as by interfacing an inboard structure 46 attached to the conveyor 24. The barrel 70 also provides effectively an inboard partition 76 (eg., the barrel 70's own skin 76) of the oven ramp 50 so that air circulation 96 can be forced in the donut skin shape shown by FIG. 2. Along with this, the barrel 70 is propped up off the enclosure 22's floor 64 to allow an underflow as well as gapped from the enclosure 22's ceiling to allow an overflow. The ramp 50 is produced as an assembly which includes either a series of resistive heating elements 53 or alternatively hollow tubes in which is circulated a hot-medium. That way the delivery of heat from the elements 53 to the food-product on the conveyor 24/30 occurs in as close proximity in including without limitation as shown by the drawings such as FIGS. 5 and 6. Also, the electric drive motor 80 for the barrel 70 is positioned outside the enclosure 22's confines rather than expose it to the heat of the oven compartment. Likewise the electric motor drive for the air circulation fan 94 is preferably removed from the oven compartment defined by the enclosure 22 (although this is not shown).

Further advantages of the invention include that this configuration is amenable to zoning. Zoning is a term describing that one oven zone is environmentally controlled to provide one environment (eg., relatively hot or hotter) that differs from another zone. FIG. 1 shows that one way to accomplish zoning is by the expedience of the two separate ovens. Presumptively the downline oven 20 might be relatively hotter than the upline oven 20', or vice versa. Regardless, the two separate ovens 20 and 20' afford zoning opportunities in respect of different environment, including differences in mean temperature, humidity, velocity of air circulation 96 and so on with other factors. FIG. 2 shows that, in consideration of a single oven 20 in isolation, there are further zoning opportunities. For instance intermediate hook-up connections 54 and 56 can be connected at one or more intermediate elevations with the helical elements or tubes 53 as shown by FIG. 2. Hence the elements 53 in a zone (ie., any of 101 through 103) defined below a given other zone (ie, any of 102 through 104 respectively) might be controlled to provide one heat-delivery environment while the elements 53 in the above zones (again, any of 102 through 104) might be controlled to provide a different heat-delivery environment. That way, a user can establish not only a hot lowest zone 101 but then also even progressively hotter upper zones 102, 103, 104 and so on. The barrel 70 might be comparably altered for zoning as by providing it with a gap corresponding to each change in zone (this is not shown). A horizontal circular plate at each gap as well as incorporation of additional air fans in the remote zones can set up separate donut patterns of air circulation 96 for each zone 101, 102, 103 and/or 104. Preferably the barrel 70's paddles 78 reach across the barrel-skin 76's gap(s) (if any) and tie together the various hoops thereof (again, no such gaps in the barrel 70 are shown).

Comparing FIGS. 5 and 6, these views show various alternative arrangements of the heat-delivering helical elements 53. Again, the heat-delivering elements 53 are optionally heat resistive elements without, however, excluding the alternative option of using hollow tubes circulated with a hot-medium such as steam or oil and the like. In FIG. 5, the heat-delivering elements 53 are disposed in close proximity to the conveyor run 30 in such an arrangement as to appear to be immediately below the conveyor run 30. The convection currents are shown rising directly up through the woven wire mesh of the conveyor 24/30 to impinge upon the food product (none shown in FIG. 5). FIG. 6 shows one or two further arrangements. As is the situation in FIG. 5, in FIG. 6 it shows one set of heat-delivering elements 53 disposed in close proximity to the conveyor run 30 in such an arrangement as to appear to be immediately below the conveyor run 30. The convection currents for the lower set of heat-delivering tubes are shown rising directly up through the woven wire mesh of the conveyor 24/30 to impinge upon the food product as shown. Alternatively, FIG. 6 also shows another set of heat-delivering elements 57 that are disposed in close proximity to the conveyor run 30 in such an arrangement as to appear to be immediately above the conveyor run 30. With the upper set of elements 57, the convection currents therefor are shown swirling downwardly originally, and thus impinging on the food product as shown before ultimately moving away. Also, the upper set of elements 57 transfer heat to the food product by radiation heat-transfer processes also.

It might be preferable, in consideration of FIG. 6, to eliminate the lower set of heat-delivery elements 53 and instead suffice with the upper set of elements 57 only. The upper set of elements 57 is partitioned from the overhead helical track sections 51' by a solid shelf 58 as shown. The solid shelf 58 would helically wind in tandem with the ramp assembly 50 as a whole, taking the form of a helical ribbon. Preferably the partition shelf 58 would provide both thermal and electrical insulation among the heat-delivering elements 57 as well as thermally and electrically isolating the tracks 51/51'. Given the foregoing, eliminating the lower set of elements 53 in favor of only overhead elements 57 would reduce or eliminate the chances of drippings from the food-product dropping down onto the tops of lower elements 53. Instead, the drippings would land and collect on the solid shelf 58. If such drippings would flow over the inboard or outboard edges of the shelf 58, preferably the drippings would be channeled away from landing upon anything below by the expediency of outfitting either or both the inboard or outboard helical edges of the solid shelf 58 with gutters.

FIG. 2 shows an alternative location for heat-delivery elements, this being indicated as heating source 92. Such a heating source 92 can comprise a bank of resistive-heating elements for heating the circulating air 96 transiting through the inside of the hollow barrel 70. It can be appreciated that heating source 92 is located relatively remotely away from the food product on the main run 30 of the conveyor or, that is, relatively remote in comparison to relatively proximity which heat-delivery elements 53 and/or 57 are located. Utilization of the heating source 92 in connection with elements 53 and/or 57 affords various control opportunities. Presumably for some process-line usages the elements 53 and/or 57 are too strong and might provide too much radiation heat transfer to the food product. In that scenario, the relatively remote heat-delivery source 92 would provide cooler, more indirect or convection heating of the food product. Persons having routine skill would appreciate the innumerable oven control opportunities afforded by the other, relatively remote heat source 92.

In the description, the term "spiral" and "helical" have been used generally interchangeably unless context dictates otherwise.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An oven for continuous duty in continuous food process lines, comprising:

a conveyor comprising in sequence a food-carrying inflow section, main run, and outflow section as well as an empty return run, which main run either ascends or descends in coils from the inflow section to the outflow section for economy of floor space;

an arrangement of heat-delivery elements entwined with the main run;

an oven compartment for enclosing the coiled main run of the food-carrying conveyor and entwined heat-delivery elements wherein said heat-delivery elements are adapted for service connections to a heat source system which provides an operative current of a medium which activates the heat-delivery elements, whereby said entwined arrangement of conveyor and heat-delivery elements provides close proximity between the food product on the conveyor and the heat-delivery elements;

wherein said heat-delivery elements are wound in tandem with a helical ramp for the helical run of the conveyor to transit thereon.

2. The oven of claim 1 wherein said coils wrap a cylindrical surface and said ascension or descension is constant over the extent of the main run such that the main run defines a helical ribbon.

3. The oven of claim 1 wherein said heat-delivery elements are entwined by virtue of being interlaced between the coils of the conveyor's main run.

4. The oven of claim 3 wherein said coils are circular and said ascension or descension is constant over the extent of the main run such that the main run defines a helical ribbon; and, the heat-delivery elements are arranged in a corresponding helical ribbon arrangement intertwined with the main run's helical ribbon arrangement.

5. The oven of claim 4 wherein individual ones of the heat-delivery elements occupy set lanes in the helical ribbon arrangement thereof.

6. The oven of claim 1 wherein the heat source comprises electric power, the heat-delivery elements comprise resistive heating elements, and the medium comprises electric current.

7. The oven of claim 1 wherein the heat source comprises a thermal-fluid heating and circulating system, the heat-delivery elements comprise hollow tubes, and the medium comprises a thermal fluid.

8. An oven for continuous duty in continuous food process lines, comprising:
a conveyor comprising in sequence a food-carrying inflow section, coiled run, and outflow section as well as an empty return run, wherein the coiled section either ascends or descends between the inflow and outflow sections;
heat-delivery elements arranged for close-proximity interaction with food product carried on the coiled run of the conveyor;
an oven compartment for enclosing at least the coiled run of the conveyor; and
a source serving input of a medium which activates the heat-delivery elements;
wherein said coiled run wraps around the surface of an imaginary cylinder and accordingly defines a hollow cylindrical core therefor;
said oven further comprising a conveyor drive system having a driven barrel disposed inside the hollow cylindrical core of the coiled run, the barrel impermanently interfacing the coiled run at least at intervals to motivate the conveyor in a direction of advance through the coiled run.

9. The oven of claim 8 wherein said heat-delivery elements are arranged in close-proximity in part with the coiled run of the conveyor by virtue of being arranged to undergird the coiled run.

10. The oven of claim 8 wherein said heat-delivery elements are arranged in close-proximity in part with the coiled run of the conveyor by virtue of being arranged in a coiled assembly which as an assembly coils in tandem with and spaced closely overhead the coiled run.

11. The oven of claim 10 further comprising a coiled shelf coiled in tandem with the coiled run and coiled assembly of heat-delivery elements wherein said shelf either catches drippings from above and/or prevents drippings from passing thereby to below.

12. The oven of claim 8 wherein said conveyor drive system is adapted for thermally isolating oven-sensitive components that comprise any of motors, engines or turbines from damaging exposure in the oven compartment by virtue of placement outside of the oven compartment.

13. The oven of claim 8 wherein the driven barrel is supplied a drive input from outside the oven compartment by a drive shaft that is passed into the oven compartment.

14. The oven of claim 8 wherein said oven compartment forms a tower closely surrounding the coiled run and having a floor and ceiling; and
wherein said barrel is propped or suspended off the floor of the oven and gapped from the ceiling in order that there is clearance both above and below the barrel for circulation of air currents inside the oven compartment;
said oven further comprising a circulating fan for setting up air circulation inside the oven compartment, blowing in one direction inside the barrel and returning in the opposite direction on the outside of the barrel like a donut skin turning inside out.

15. The oven of claim 8 wherein the heat-delivery elements can be differentiated into zones according to elevation, said source differentially serves the differentiated zones of heat-delivery elements in order to establish elevational zones within the oven compartment that can be differentiated according what heat load can be delivered.

16. The oven of claim 8 wherein said source comprises electric power service, the heat-delivery elements comprise resistive heating elements, and the medium comprises electric current.

17. The oven of claim 8 wherein said source comprises a thermal-fluid heating and circulating system, the heat-delivery elements comprise hollow tubes, and the medium comprises a thermal fluid.

18. An oven for continuous duty in continuous food process lines, comprising:
an oven compartment enclosing a double-helix arrangement that is arranged about a generally vertical central axis and defines a hollow cylindrical core as well as an outer cylindrical perimeter, said double-helix arrangement comprising one of a ventilated helical run of a food-carrying conveyor and another of a ventilated helical ramp;
an open-ended inner cylindrical partition substantially occupying the hollow cylindrical core and extending vertically substantially coextensively with the double-helix arrangement as well as being either suspended or propped in the compartment and providing gaps proximate the floor and ceiling respectively to allow both an underflow along the floor and an overflow along the ceiling respectively; and
a source of air circulation to induce a substantially vertical current inside the cylindrical partition;
said oven compartment having a lateral cylindrical sidewall, a ceiling, a floor, an upper infill section spanning between the ceiling and sidewall as well as a lower infill section spanning between the floor and sidewall in order to—in part, and cooperatively —eliminate perpendicular intersections for ease of cleaning away contaminants, one central protuberance bulging up from the floor, and another central protuberance dropping down from the ceiling, which altogether generally define a donut-shaped interior contour for shaping the air circulation pattern to simulate a donut skin rotating inside out without actually orbiting the vertical central axis, whereby any given particle in said circulation pattern generally completes a circuit without crossing over the central axis and within generally the same radial slice, substantially independent of any orbiting of the central vertical axis.

19. An oven for continuous duty in continuous food process lines, comprising:
an oven compartment enclosing a double-helix arrangement that is arranged about a generally vertical central axis and defines a hollow cylindrical core, said double-helix arrangement comprising one of a helical run of a foodcarrying conveyor and another of a helical ramp;
a drive cylinder substantially occupying the hollow cylindrical core and extending vertically substantially coextensively with the double-helix arrangement double-helix arrangement as well as being either suspended or propped in the compartment for rotation;
said drive cylinder having drive applicators and said conveyor having drive-applicator responders whereby the rotation of the drive cylinder motivates the conveyor to transit the helical ramp; and
a drive source applied to the drive cylinder spaced radially substantially away from the central vertical axis whereby the drive cylinder is liberated from the necessity of clutter within the hollow core thereof of structure as central shafting or radial spokes.

20. The oven of claim 19 further comprising:
a source of air circulation operative inside the drive cylinder to induce a substantially vertical current within said drive cylinder;
wherein said drive cylinder is furthermore either suspended or propped in the compartment to provide gaps proximate the floor and ceiling respectively to allow both an underflow along the floor and an overflow along the ceiling respectively, whereby said drive cylinder concurrently functions as a transmission of drive to the conveyor at the same time as functioning as a duct for the circulation of air.

21. An oven for continuous duty in continuous food process lines, comprising:
an oven compartment enclosing a ventilated helical run of a food-carrying conveyor that is arranged about a generally vertical central axis and defines a hollow cylindrical core as well as an outer cylindrical perimeter;
an open-ended inner cylindrical partition substantially occupying the hollow cylindrical core and extending vertically substantially coextensively with the ventilated helical run of the food-carrying conveyor as well as being either suspended or propped in the compartment and providing gaps proximate the floor and ceiling respectively to allow both an underflow along the floor and an overflow along the ceiling respectively; and
a source of air circulation to induce a substantially vertical current inside the cylindrical partition;
said oven compartment having a lateral cylindrical sidewall, a ceiling, a floor, an upper infill section spanning between the ceiling and sidewall as well as a lower infill section spanning between the floor and sidewall in order to—in part, and cooperatively—eliminate perpendicular intersections for ease of cleaning away contaminants, one central protuberance bulging up from the floor, and another central protuberance dropping down from the ceiling, which altogether generally define a donut-shaped interior contour for shaping the air circulation pattern to simulate a donut skin rotating inside out without actually orbiting the vertical central axis, whereby any given particle in said circulation pattern generally completes a circuit without crossing over the central axis and within generally the same radial slice, substantially independent of any orbiting of the central vertical axis.

22. An oven for continuous duty in continuous food process lines, comprising:
an oven compartment enclosing a ventilated helical run of a food-carrying conveyor that is arranged about a generally vertical central axis and defines a hollow cylindrical core as well as an outer cylindrical perimeter;
a drive cylinder having a lateral cylindrical sidewall extending between upper and lower hoop edges, wherein said drive cylinder substantially occupies the hollow cylindrical core and extends vertically substantially coextensively with the ventilated helical run of the food-carrying conveyor as well as being either suspended or propped in the compartment for rotation by either a ring arrangement of hangers associated with the upper hoop edge or a ring arrangement of rolling stock associated with the lower hoop edge, either of which allows the elimination of a central axle and spokes therefor;
said drive cylinder having drive applicators and said conveyor having drive-applicator responders whereby the rotation of the drive cylinder motivates the conveyor to transit the helical ramp; and
a drive source applied to the drive cylinder along the sidewall thereof or along either of the hoop edges but not by a central axle having spokes radiating to fixtures on the sidewall.

23. The oven of claim 22 further comprising:
a source of air circulation operative inside the drive cylinder to induce a substantially vertical current within said drive cylinder;
wherein said drive cylinder is furthermore either suspended or propped in the compartment to provide gaps proximate the floor and ceiling respectively to allow both an underflow along the floor and an overflow along the ceiling respectively, whereby said drive cylinder concurrently functions as a transmission of drive to the conveyor at the same time as functioning as a duct for the circulation of air.

24. An oven for continuous duty in continuous food process lines, comprising:
an oven compartment enclosing a ventilated helical run of a food-carrying conveyor that is arranged about a generally vertical central axis and defines a hollow cylindrical core as well as an outer cylindrical perimeter;
an open-ended inner cylindrical partition substantially occupying the hollow cylindrical core and extending vertically substantially coextensively with the ventilated helical run of the food-carrying conveyor as well as being either suspended or propped in the compartment and providing gaps proximate the floor and ceiling respectively to allow both an underflow along the floor and an overflow along the ceiling respectively; and
at least one air circulation fan operatively disposed inside the open-ended inner cylindrical partition to induce a substantially vertical current therein, whereby said fan as disposed in the open-ended inner cylindrical partition allows reduction of the number of prospective air circulation fans needed for operative sufficiency to just said one.

* * * * *